(12) United States Patent
Thomson

(10) Patent No.: US 12,223,648 B2
(45) Date of Patent: Feb. 11, 2025

(54) OPTIMIZING RENDERING CONDITION FOR MEDICAL IMAGE DATA BASED ON DETECTION CERTAINTY FROM MACHINE LEARNING MODEL

(71) Applicant: CANON MEDICAL SYSTEMS CORPORATION, Otawara (JP)

(72) Inventor: Paul Thomson, Edinburgh (GB)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 392 days.

(21) Appl. No.: 17/815,644

(22) Filed: Jul. 28, 2022

(65) Prior Publication Data

US 2024/0037731 A1 Feb. 1, 2024

(51) Int. Cl.
| | |
|---|---|
| *G06T 7/00* | (2017.01) |
| *G06T 15/08* | (2011.01) |
| *G06T 15/40* | (2011.01) |
| *G06T 15/50* | (2011.01) |

(52) U.S. Cl.
CPC ............ *G06T 7/0012* (2013.01); *G06T 15/08* (2013.01); *G06T 15/40* (2013.01); *G06T 15/506* (2013.01); *G06T 2207/20081* (2013.01); *G06T 2207/30008* (2013.01); *G06T 2207/30096* (2013.01); *G06T 2210/41* (2013.01)

(58) Field of Classification Search
CPC ..... G06T 7/0012; G06T 7/0014; G06T 15/08; G06T 15/40; G06T 15/50; G06T 15/506; G06T 2210/41; G06T 2207/20081; G06T 2207/30004; G06T 2207/30008; G06T 2207/30012; G06T 2207/30048; G06T 2207/30096; G06T 2207/30101; G06T 2207/30104
See application file for complete search history.

(56) References Cited

U.S. PATENT DOCUMENTS

| | | | |
|---|---|---|---|
| 7,529,394 B2 * | 5/2009 | Krishnan | G16H 30/40 706/14 |
| 10,593,099 B2 * | 3/2020 | Sudarsky | G16H 40/63 |
| 2017/0061681 A1 | 3/2017 | Engel et al. | |
| 2017/0262598 A1 | 9/2017 | Petkov et al. | |
| 2020/0051319 A1 | 2/2020 | Wahrenberg | |

(Continued)

FOREIGN PATENT DOCUMENTS

CN 112669941 A 4/2021

OTHER PUBLICATIONS

Khan, Usman, et al. "A methodological review of 3D reconstruction techniques in tomographic imaging." Journal of Medical Systems 42, No. 10, p. 190 (Year: 2018).*

(Continued)

*Primary Examiner* — Scott A Rogers
(74) *Attorney, Agent, or Firm* — Oblon, McClelland, Maier & Neustadt, L.L.P.

(57) ABSTRACT

A medical image processing apparatus comprising processing circuitry configured to: receive medical image data including a region of interest; generate first rendering data by rendering the medical image data based on a first rendering condition; receive a characteristic value relating to detection certainty with respect to the region of interest by inputting the first rendering data to a machine learning model; determine a property of the first rendering condition based on the characteristic value.

20 Claims, 2 Drawing Sheets

(56) References Cited

U.S. PATENT DOCUMENTS

2021/0183517 A1    6/2021  Li et al.
2023/0386184 A1*  11/2023  Duffy ..................... G06N 3/09

OTHER PUBLICATIONS

Alain Blum et al., "Synergistic Role of Newer Techniques for Forensic and Postmortem CT Examinations", American Journal of Roentgenology, vol. 211, No. 1, Jul. 2018, 10 pages (https://www.ajronline.org/doi/10.2214/AJR.17.19046).

Lin Zheng, "Using Global Illumination in Volume Visualization of Rheumatoid Arthritis CT Data", IEEE Comput Graph Appl. 2014; 34(6): 16-23, pp. 1-17 (https://api.semanticscholar.org/CorpusID:11755289).

Yubo Zhang et al., "Lighting Design for Globally Illuminated Volume Rendering", IEEE Transactions On Visualization and Computer Graphics, vol. 19, No. 12, Dec. 2013, pp. 2946-2955 (https://ieeexplore.ieee.org/document/6634193).

* cited by examiner

OPTIMIZING RENDERING CONDITION FOR MEDICAL IMAGE DATA BASED ON DETECTION CERTAINTY FROM MACHINE LEARNING MODEL

FIELD

Embodiments described herein relate generally to an image processing method and apparatus, for example a method and apparatus for determining settings for creating a rendered image from medical image data.

BACKGROUND

It is known to render images from volumetric imaging data, for example from volumetric medical imaging data. A set of volumetric imaging data may be referred to as an image volume. The set of volumetric imaging data may comprise a plurality of voxels with associated voxel values, with each voxel being representative of a corresponding spatial location in a medical imaging scan. For example, in the case of computed tomography (CT) data, the voxel value associated with each voxel may be a voxel intensity value that is representative of an attenuation of applied X-ray radiation at the location represented by the voxel.

It is known to render three-dimensional (3D) imaging data to produce a rendered image that appears to be three-dimensional.

Lighting effects may be added to a 3D image such that a subject of the image appears to be illuminated from a given position and/or direction. In recent years, 3D medical images have been made more realistic through the use of advanced lighting techniques (referred to as global illumination, gradient free lighting, subsurface scattering or photon mapping) that simulate illumination with a more physically accurate model than was previously used. In global illumination, a lighting model may be used that includes both direct illumination by light coming directly from a light source and indirect illumination, for example illumination by light that has been scattered from another surface.

In some global illumination rendering methods, an image is rendered from a volumetric imaging data set using a two-pass method in which a first pass creates a light volume, and a second pass uses the light volume to render an image for display.

The first pass may comprise a traversal from the light source into the volumetric imaging data set, in which virtual light is cast into the volumetric imaging data set. The irradiance due to the light source may be determined at each of a large array of points in the volumetric image data set using absorptive properties assigned to the voxels in dependence on the voxel intensities. The irradiance values at the array of points may be stored as a light volume. The light volume may be stored in memory. The light volume may be independent of the viewpoint.

A second pass may comprise a traversal through the light volume from a virtual camera, using the light volume to provide global lighting information. Rays may be cast from the virtual camera (for example, one ray for each pixel of the resulting rendered image), and irradiances from points along each ray may be integrated to provide pixel color values for a final rendered image.

Global illumination (GI) is gaining in popularity and may be considered to be ubiquitous in ultrasound. Global illumination may previously have been considered to occupy a niche in obstetrics, but now is used in a wide range of applications. For example, global illumination may be used in cardiac, radiology or vascular imaging. Global illumination may be used in three-dimensional Doppler imaging. There is also interest in the use of global illumination in other modalities, for example CT (computed tomography) and MR (magnetic resonance) imaging.

For example, Global illumination (GI) may be used to create images to be viewed by a person to determine if there is a bone fracture or to identify calcification. GI can produce very realistic images compared with standard volume rendering approaches. However, the parameters of GI need to be chosen carefully to provide suitable images for specific purposes. The wide choice of parameters available with GI make this challenging and, although presets may give a user a good starting position, they may not be optimized for a particular dataset or task. For example, GI methods may not be helpful for rheumatoid arthritis if light sources are not property placed.

BRIEF DESCRIPTION OF THE DRAWINGS

Embodiments are now described, by way of non-limiting example, and are illustrated in the following figures, in which:—

DETAILED DESCRIPTION

Certain embodiments provide a medical image processing apparatus comprising processing circuitry configured to: receive medical image data including a region of interest; generate first rendering data by rendering the medical image data based on a first rendering condition; receive a characteristic value relating to detection certainty with respect to the region of interest by inputting the first rendering data to a machine learning model; determine a property of the first rendering condition based on the characteristic value.

Certain embodiments provide a medical image processing method, comprising: receiving medical image data including a region of interest; generating first rendering data by rendering the medical image data based on a first rendering condition; receiving a characteristic value relating to detection certainty with respect to the region of interest by inputting the first rendering data to a machine learning model; determining a property of the first rendering condition based on the characteristic value.

Certain embodiments provide a medical image processing apparatus comprising processing circuitry configured to train a machine learning model to perform a detection task on first rendering data with respect to a region of interest of medical image data, wherein the training is performed on a training set of rendering data that are annotated.

Certain embodiments provide a training method comprising: training a machine learning model to perform a detection task on first rendering data with respect to a region of interest of medical image data, wherein the training is performed on a training set of rendering data that are annotated.

Figure 1:
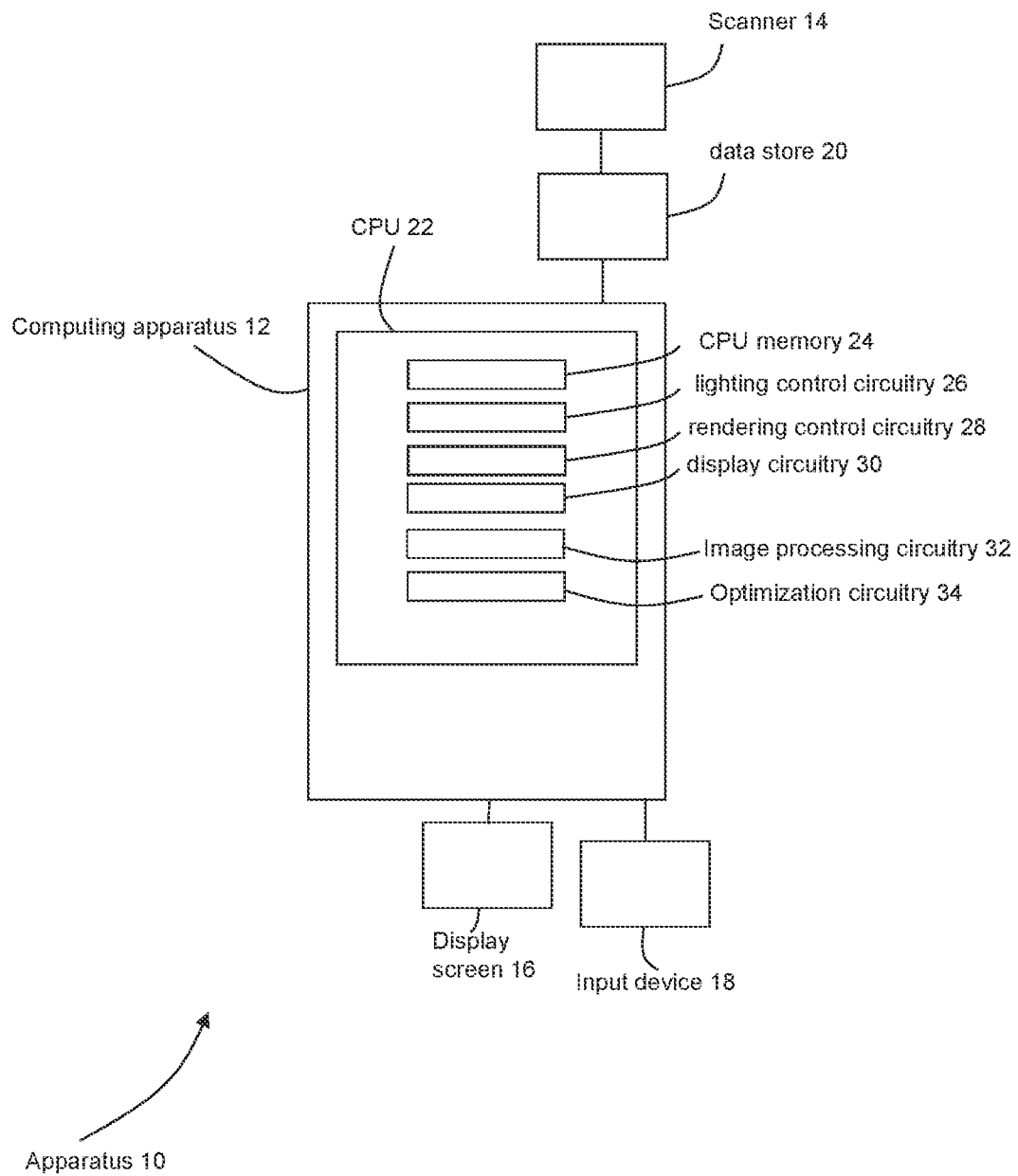
FIG. 1 is a schematic diagram of a medical imaging apparatus in accordance with an embodiment.

An apparatus 10 according to an embodiment is illustrated schematically in FIG. 1. The apparatus 10 is configured to perform volume rendering of imaging data acquired by a medical imaging scanner 14 or scanners, which may comprise at least one of a CT (computed tomography) scanner, an MRI (magnetic resonance imaging) scanner, an X-ray scanner, a PET (positron emission tomography) scanner, a SPECT (single photon emission computed tomography) scanner, or an ultrasound scanner, or any suitable scanner. In the present embodiment, the scanner 14 is an CT scanner which is configured to obtain 3D data. The scanner 14 is configured to generate image data that is representative of at least one anatomical region of a patient or other subject. The image data comprises a plurality of voxels each having a corresponding data value. In the present embodiment, the data values are representative of X-ray intensity.

In the embodiment of FIG. 1, the rendering is of images for display on a display screen 16.

The apparatus 10 comprises a computing apparatus 12, which in this case is a personal computer (PC) or workstation. In other embodiments, the computing apparatus 12 may be any suitable computing apparatus, for example a server, desktop computer, laptop computer, or mobile device. In further embodiments, functionality of the computing apparatus 12 may be provided by two or more computing apparatuses.

The computing apparatus 12 is connected to the scanner 14 or scanners via a data store 20.

The computing apparatus is connected to an input device or devices 18, such as a computer keyboard, mouse or hand controller. In alternative embodiments, the display screen 16 is a touch screen, which also acts as an input device 18.

In the present embodiment, the computing apparatus 12 is configured to receive the medical imaging data that is to be processed from the data store 20. The data store 20 stores data acquired by the medical imaging scanner 14 or scanners.

In alternative embodiments, the computing apparatus 12 receives data from one or more further data stores (not shown) instead of or in addition to data store 10. For example, the computing apparatus 12 may receive data from one or more remote data stores (not shown) which may form part of a Picture Archiving and Communication System (PACS) or other information system, for example a laboratory data archive, an Electronic Medical Record (EMR) system, or an Admission Discharge and Transfer (ADT) system.

In further embodiments, the computing apparatus 12 is not connected to a scanner 14. The computing apparatus 12 may receive previously acquired medical imaging data from any suitable data store.

Computing apparatus 12 comprises a central processing unit (CPU) 22. The CPU 22 provides a processing resource for automatically or semi-automatically processing medical imaging data.

The CPU 22 comprises a memory 24, lighting control circuitry 26 for controlling lighting calculation, rendering control circuitry 28 for controlling rendering, and display circuitry 30 for displaying rendered images on the display screen 16. Circuitry of the CPU 22 may transfer data to and from the memory 24 via a memory bus (not shown), which may be configured to send data at a rate of, for example, around 100 GB/s. A memory controller (not shown) may be used to control reading data from the memory 24 and writing data to the memory 24. In other embodiments, the apparatus 10 may comprise multiple CPUs, each having a respective memory.

The CPU 22 comprises image processing circuitry 32 for processing image data using a trained model to obtain a prediction on whether there is a bone fracture and provide a prediction certainty value. The CPU 22 includes optimization circuitry 34 for performing an optimization procedure on Global Illumination (GI) parameters to obtain a rendered image to provide to a user that is suitable for a user to determine if there is a bone fracture. The display circuitry 30 of the CPU 22 is for displaying images obtained using the optimized GI parameters.

In the present embodiment, the circuitries 26, 28, 30, 32 34 are each implemented in computing apparatus 12 by means of a computer program having computer-readable instructions that are executable to perform the method of the embodiment. However, in other embodiments, the various circuitries may be implemented as one or more ASICs (application specific integrated circuits) or FPGAs (field programmable gate arrays). In further embodiments, any suitable CPU components and/or GPU components may be implemented as one or more ASICs or FPGAs.

The computing apparatus 12 also includes a hard drive and other components of a PC including RAM, ROM, one or more further data buses, an operating system including various device drivers, and hardware devices including a graphics card. Such components are not shown in FIG. 1 for clarity.

The lighting control circuitry 26 instructs a GPU (not shown) to perform a light simulation on a volumetric imaging data set that is obtained from a medical imaging scan of a patient. An output of the light simulation is an irradiance volume. The rendering control circuitry 28 instructs the GPU to perform an image render using the volumetric imaging data set and the irradiance volume. The display circuitry 30 instructs the rendered images to be displayed on the display screen 16. It will be appreciated that the steps could be performed using any suitable apparatus, e.g. CPU or GPU.

Figure 2:
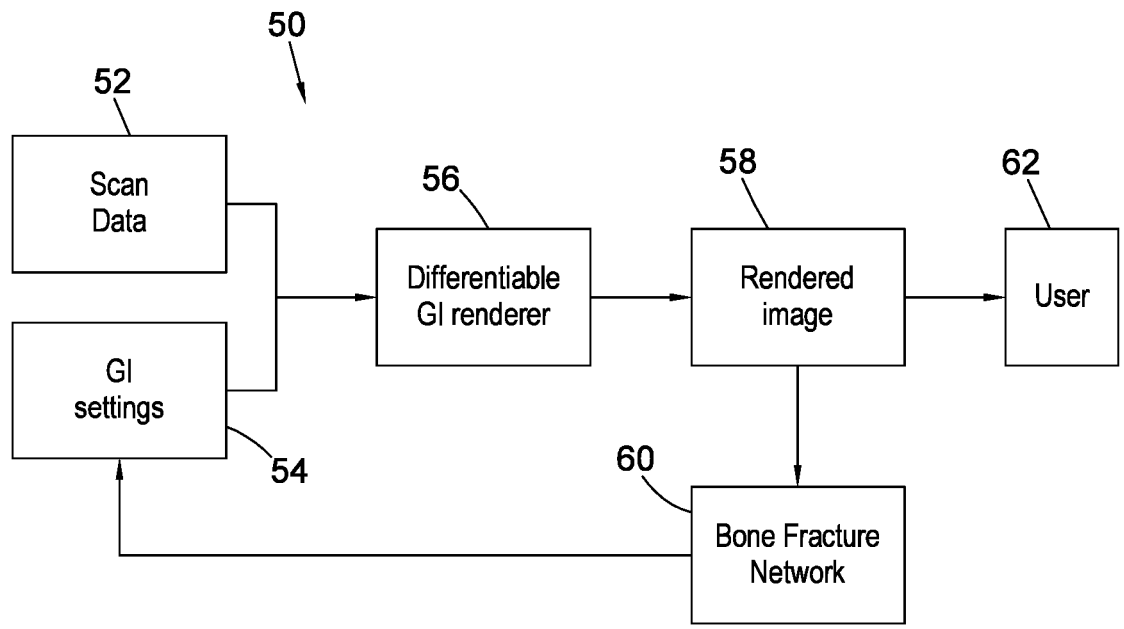
FIG. 2 is a flow chart illustrating in overview a method of an embodiment in which settings for creating a rendered image from medical image data are determined.

FIG. 2 is a flow chart illustrating in overview a method of an embodiment. The apparatus of FIG. 1 is configured to perform a method 50 of processing medical image data as illustrated in FIG. 2. In other embodiments, any suitable apparatus or apparatuses may be used to perform the method of FIG. 2.

At the start of the method of FIG. 2, scan data 52 and pre-set GI (Global Illumination) settings 54 (i.e. GI parameters) are passed to the lighting control circuitry 26 and the rendering control circuitry 28 (shown as a differentiable GI renderer 56) to generate a rendered image 58 (first rendering data). The scan data 52 is medical image data. The GI settings 54 may relate to e.g. number, position and intensity of light sources; balance between primary light and ambient light; viewing angle and material properties such as colour, opacity, absorption, and reflectance.

The scan data 52 (i.e. the medical image data) includes a region of interest. For example, the medical image data may be of a patient with a suspected bone fracture and the region of interest may be where the suspected bone fracture is located. The region of interest may be considered to be a candidate region or regions (i.e. where to look) in the rendered image and/or the set of medical imaging data. The region of interest may be determined by the user (i.e. based on input from the user) or automatically, e.g. by another AI network and it could be based on raw data.

The rendered image 58 is generated by rendering the scan data 52 based on the GI settings 54. That is, the first rendering data is generated by rendering the medical image data based on a first rendering condition.

The GI settings 54 may be particular GI visualization parameter values. In this embodiment, the GI settings 54 are part of a preset but, in other embodiments, they may be manually defined and/or specifically selected for bone fracture imaging and/or detection.

The image processing circuitry 32 then receives the rendered image 58 (i.e. first rendering data). The image processing circuitry 32 inputs the rendered image 58 to a Bone Fracture Network (BFN) 60. The BFN 60 may be a Neural Network (NN), for example a Convolutional Neural Network (CNN), Unet, ResNet, Vnet, or R-CNN. The BFN 60 is trained to predict whether there is a bone fracture present given an input of a rendered image.

In other embodiments, any suitable method may be used to obtain a prediction on whether there is a bone fracture and provide a prediction certainty value. Any suitable trained model or models may be used. In some embodiments, the models may not be NNs. For example, for non-NN machine learning then random forest, feature-based approaches, SVM, or kNN may be used. The BFN 60 may be any suitable machine learning model. In some embodiments, the BFN (i.e. the model) does not need to be machine learning, e.g. it may be morphology based or edge detection.

The BFN 60 carries out the bone fracture detection task on the region of interest. This may be considered to be inference time (not training time). The BFN 60 outputs a prediction on whether there is a bone fracture or not, and a prediction certainty value.

The output may be a characteristic value relating to detection certainty of the bone fracture which may provide information on whether the BNF 60 considers that there is a bone fracture and the certainty that it is correct. In some embodiments, the characteristic value may only contain information on the certainty that the prediction made by the BFN 60 is correct, rather than also the indication of what that prediction is. In general, the characteristic value provides an indication of the certainty of the prediction made by the BNF 60.

The BFN 60 takes the rendered image 58, attempts bone fracture detection, and then gives an indication about how good the image is for seeing a bone fracture. That is, the BFN 60 attempts to detect whether there is a bone fracture and provides the prediction certainty value on whether there is (or isn't) a bone fracture (i.e. the characteristic value relating to detection certainty of the bone fracture in the region of interest).

The network certainty (i.e. the characteristic value) may be determined by an ensemble or dropout approach. That is, in the ensemble approach there may be a plurality of machine learning models, (e.g. the same networks but with different starting weights or different architectures) which are linked (in any combination) or averaged to provide the characteristic value. In the dropout approach, there may be a single network that is run many times, each time randomly removing parts of the network. Thus, there may be many outputs and these can be checked to see if they are consistent and an average may be taken to provide the characteristic value.

As an example, the characteristic value (which may be considered to be the prediction certainty value) may be defined by a single scalar output (i.e. value). For example, the range of possible characteristic value may be 0 to 1. For example, if the characteristic value is 0 then the BNF 60 is definitely sure that there is no fracture in the rendered image 58. If the characteristic value is 1 then the BNF 60 is definitely sure there is a fracture in the rendered image 58. That is, 0 means no fracture present, 1 means fracture is present. All the values in between 0 and 1 show some degree of uncertainty (or at least, they can be interpreted that way).

If the characteristic value is 0.5 (or −0.5) then the BNF 60 is uncertain whether there is a fracture in the rendered image 58 or not. In other words, a value of 0.5 could be interpreted as the BNF 60 having no idea either way if a fracture is present or not. More generally, if the characteristic value (i.e. network certainty) is substantially in the middle of the expected range of characteristic values, then it is considered to be completely uncertain one way or the other. All the values in between end points of the expected range of characteristic values show some degree of uncertainty (or at least, they can be interpreted that way). If the BNF 60 is uncertain on whether a fracture is present, then the GI settings 54 are optimized (i.e. changed) as will be explained. Determining whether the GI settings are (and are not optimized) may be treated like any optimization problem. That is, there may be some optimizer and some stopping criterion may be defined for that (see examples of differentiable and non-differentiable optimizers here: https://machinelearningmastery.com/tour-of-optimization-algorithms/).

As will be explained in more detail later, the BNF 60 is trained, e.g. using expert annotation. During training, the characteristic value (e.g. the scalar output) may be compared to the correct value from the expert annotation. This can give a measure of accuracy which can then be used to train the BNF 60. When the BFN 60 is carrying out the bone fracture detection task in practice (i.e. at inference time, not training time) the expert annotation of whether there is a bone fracture or not is not available so there is not a way of measuring accuracy. However, the characteristic value (e.g. an output scalar) is provided, which may be interpreted as confidence that the BFN 60 is able to detect that there is (or isn't) a bone fracture present.

It will be appreciated that the range of characteristic values (e.g. 0 to 1) is just an example and, in other embodiments, the certainty of the BNF 60 may be illustrated in other ways. For example, the BNF 60 may be considered to be uncertain when the characteristic value is lower (or higher) than a predetermined threshold. For example, when the characteristic value is lower than 1 or higher than 0. Also, more generally, the BNF 60 may be considered to be uncertain when the characteristic value is in (or out of) a predetermined range. For example, when the characteristic value is between 0 and 1. In addition, the BNF 60 may be considered to be uncertain when the characteristic value is at least one of a predetermined characteristic value (e.g. 0.5), within a predetermined range or percentage of a predetermined characteristic value, and substantially centrally between predetermined maximum and minimum characteristic values.

By inputting the rendered image 58 (first rendering data) into the BNF 60, the image processing circuitry 32 receives the characteristic value which is then input to the optimization circuitry 34.

Depending on the characteristic value, it is determined whether the GI settings 54 are to be changed. For example, if the characteristic value is in a predetermined range then a second rendered image 58 (i.e. second rendering data) is rendered using different GI settings 54, which are determined in an optimization procedure (i.e. based on a second rendering condition which is different from the first rendering condition). If the GI settings 54 are to be changed then the optimization circuitry 34 performs the optimization procedure by optimizing the GI settings 54 in order to minimize the certainty-based loss. The optimization procedure may be a constrained optimization procedure.

The differentiable GI renderer 56 is used to optimize the GI settings 54. As an example, this library, https://www.mitsuba-renderer.org/, can do differentiable rendering. In order to get a differentiable GI renderer, various components of that library need to put together. As the space of GI setting 54 (GI parameters) is very large, the differentiable renderer may be required for efficient optimization. The optimization may comprise a gradient based method. Differentiable means that the gradient can be calculated with respect to its input.

A loss function may be used to minimize uncertainty. Optimization takes place by minimization or maximization. In embodiments, it may be desired to move the characteristic value to 0 or 1 (i.e. bone fracture not present or bone fracture present respectively). In this case, a loss function is required to take a value in the range 0 to 1 and covert it so that 0.5 has a high value and 0 or 1 has a low value. Then this function can be minimized.

Figure 3:
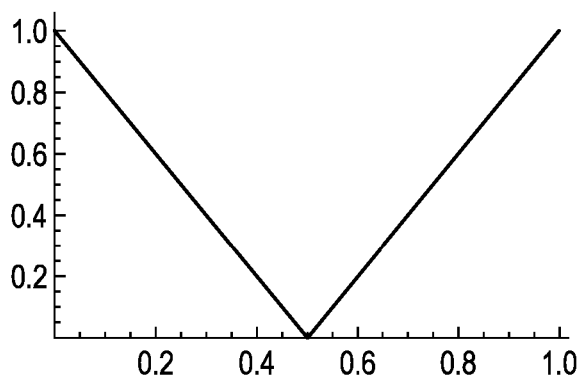
FIG. 3 is a graph of an absolute loss function in accordance with an embodiment.
Figure 4:
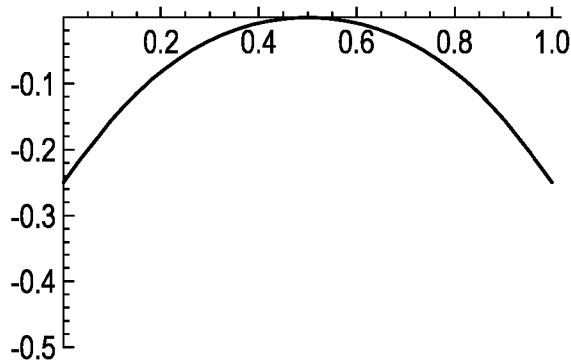
FIG. 4 is a graph of a square loss function in accordance with an embodiment.

FIG. 3 shows a graph of an example loss function, i.e. absolute function. However, the absolute function has a discontinuous gradient at x=0.5. FIG. 4 shows a graph of another example loss function, i.e. square function: $-(x-0.5)^2$. In this function, 0.5 is subtracted so that it becomes a minimum value and the whole function is negative so it is a minimization rather than a maximization. The square function, which is smooth everywhere, may be used instead of the absolute function.

A possible problem with the previous approach is that the optimization may be pushed to whatever it is closest to (e.g. if the score is >0.5, it will try to maximize it, i.e. go to 1. A different approach is to just run both optimizations. That is, try to maximize the value, i.e. go to 1 (make image look like a fracture) and then try to minimize the value separately, i.e. go to 0 (make it look like there isn't a fracture). The result that is preferred may then be chosen (e.g. by choosing the option which is closer to 1 or 0 respectively). Additionally or alternatively, both options could be displayed to the user. It will be appreciated that, in other embodiments, other methods of optimization and/or loss terms may be used. Furthermore, in other embodiments, the characteristic value may be different.

The BFN 60 may also be differentiable, e.g. if it has been trained using a differentiable method. This may provide efficient optimization. In principle, a non-differentiable renderer may be used but this would be relatively very slow. If the whole optimization function is differentiable then gradient based optimizers may be used (e.g. stochastic gradient descent, AdaGrad, Adam). If some part is not differentiable then gradient approximation (finite difference) or non-gradient based optimizers (e.g. Powell, LBFGS) may be used. Due to the high number of dimensions of the GI settings these alternatives are likely to take significantly longer to complete.

The rendering of the rendered image 58 may be repeated to produce a second image 58 (i.e. the second rendering data may be generated).

The method 50 of FIG. 2 is an iterative process and may continue until a desired outcome is reached. The method 50 will continue around the loop (GI settings 54, Differentiable GI renderer 56, Rendered image 58. BNF 60) of FIG. 2 until a predetermined outcome (i.e. a stopping criterion) is reached. In other words, further rendering data is generated by rendering the medical image data based on further rendering conditions which are different from the first and second rendering conditions in an iterative optimization process until the stopping criterion is reached. For example, there may be third, fourth, fifth rendering conditions . . . etc. until the stopping criterion is reached. For each of the third, fourth, fifth rendering conditions etc., it is determined, based on the characteristic value, that the BNF 60 is uncertain on whether a fracture is present, and thus the GI settings 54 are optimized (i.e. changed).

The stopping criteria may not be defined in terms of specific values in the objective space but instead may be defined in terms of the optimization process over time. For example, if the characteristic value does not change by more than a percentage (e.g. 1%) after a number (e.g. 5) of iterations. In other words, a change in the characteristic value is less than a predetermined percentage (e.g. 1%) over a predetermined number (e.g. 5) of rendered images (further rendering conditions). Alternatively. or additionally, the stopping criterion may be that a predetermined characteristic value is reached, e.g. 0 or 1. Alternatively, or additionally, the stopping criterion may be that a predetermined number of rendered images (further rendering conditions) have been reached. More generally, the optimization may stop when it has been determined a local minimum or maximum has been found. That is, determination that a local minimum or maximum of the optimization process has been reached. During the optimization of the GI settings 54, the characteristic value may go more towards 1 or more towards 0, i.e. look like it is going in one direction or the other. However, the stopping criterion may be required as it is not guaranteed that the characteristic value goes all the way to 0 or 1.

In order to optimize the GI settings 54, the gradient may be back-propagated to increase network certainty (e.g. provide a characteristic value closer to 0 or 1). The gradient provides an indication of certainty (based on the loss function) and thus which direction to go in for the optimization.

The optimization includes a term (part of the loss function) to discourage visualization parameter values that result in an unrealistic image. A realistic image may be considered to be one in which the parameter settings are human-like (i.e. are like those that would be chosen by a human). The term is derived from an adversarially trained classifier that distinguishes between images obtained with given visualization parameter values, and images that have been chosen as good images, e.g. by a user. The good images may be images derived from other visualization methods and/or photographs. A good image may be considered to be one in which a user has chosen as showing the region of interest well enough to be confident that there is a bone fracture or not.

In some embodiments, pre-determined options may be used to reduce size of optimization space (e.g. number of light sources, viewing angle or the balance between primary light and ambient light may be constrained). In other words, parameter space is limited to a region near the starting pre-set GI settings 54 (i.e. the first rendering condition). The at least one visualization parameter value may be limited to be within a predetermined distance in parameter space from the starting set of visualization parameter values. There may be a pre-determined maximum distance from pre-set GI settings 54 to prevent trivial/null solutions.

Occlusion of the region of interest (e.g. candidate bone fracture region) may cause problems and should be excluded through other mechanisms. This may be a situation where there is a fracture but it can't be seen (e.g. because of angle) and this could be confusing. It will be appreciated that there are solutions to this problem of hidden-surface determination, particularly solutions that come from the field of rendering. Hidden-surface determination may be considered to be the process of identifying what surfaces and parts of surfaces can be seen from a particular viewing angle. For example, a or hidden-surface determination algorithm may be used to prevent occlusion of the region of interest. However, it will be appreciated that any appropriate method be used to ensure region of interest and/or bone fracture is not occluded at the viewing angle.

Once the iteration is completed, then the rendered image 58 (which is based on the GI settings 54 at which the stopping criterion was reached) is shown to the user (human). The image may be a GI rendered 2D image. That is, a 2D array of pixels. The user (e.g. doctor) can then carry out the clinical diagnosis (e.g. determine whether there is a bone fracture or not.)

Additionally, or alternatively, the output may be a property of the first, second or further rendering condition. For the further rendering condition, this may be the further rendering condition at which the stopping criterion was reached. The property may be a visualization parameter value or particular configuration of visualization parameter values (e.g. a particular lighting configuration) of the global illumination method.

As an example, if the characteristic value is outside a predetermined range, then the rendered image 58 is provided to the display circuitry 30. The display circuitry 30 performs a display task in which an image obtained from the scan data 52 and the optimized GI settings 54 is displayed to a user 62. More generally, scan data may be rendered using any suitable rendering method and displayed to the user on display screen 16.

It may be considered that the BFN 60 acts as a proxy for the user (human) in making GI setting decisions. Since there are so many different possible parameters for GI, using the trained BFN 60 to identify suitable GI settings 54 for the rendered image 58 of the scan data 52 allows a user to carry out the clinical diagnosis more accurately and efficiently. This is because the user is presented with a rendered image 58 prepared using GI settings 54 that have been determined to provide a good image for bone fracture detection and that they have not had to modify these settings themselves.

The BFN 60 is a trained machine learning model. The BFN 60 is trained on rendered images, not the raw data (i.e. the scan data 52). The BFN 60 is trained to identify bone fractures from rendered images. In this embodiment, the rendered images are GI rendered images (because that is what the BFN 60 is going to see at inference time and because it is desired to optimize the GI settings at inference time). In other embodiments, e.g. where the settings are not being optimized for GI, the rendered images could be other types of rendered images, i.e. not GI rendered images.

The BFN 60 has been trained to classify GI images as a having a fracture present or not (i.e. not whether image is "good"). The images for training have been annotated by a (human) expert to indicate if there is a bone fracture or not (i.e. the expert views the images, identifies whether there is a bone fracture or not and annotates the images accordingly). The raw data is available, and the expert can annotate in any format. This means that the expert could look at a rendered image from the raw data which is different from the rendered image that is shown to the BFN 60. That is, the expert only needs to annotate any rendered image rendered from the raw data as showing a fracture or not. The expert does not need to view the rendered image that is shown to the BFN 60 and annotate whether that particular rendered image shows a fracture, although the expert could look at that rendered image if desired. In other words, when the expert (e.g. doctor) is creating the annotation they can view the volume data using whatever method they want (e.g. CT, GI, MIP). The annotations will then be converted to the volume data. Then, for training, that volume data is used to make GI images and the corresponding annotations are used to compute the loss.

The GI renderer (e.g. differentiable GI renderer 56) is used to create 2D images, centered on the region of interest. The GI parameters may be varied starting from pre-set configurations. This means that lots of images with different GI parameters may be created from one set of raw data. That is, more training data is created from a single source of data. It is desired for the BFN 60 to see lots of different sets of GI parameters in the training process. There are lots of possible options for GI parameters and so bounds may be set, but it may be desired for the BFN 60 to see everything within the bounds. For example, it may be desirable that the training set covers all explorable parameter space. More generally, the training set may be augmented with a plurality of different rendering conditions. Some examples of bounds may be restricting colours to realistic colours (e.g. may not want bright green) or limiting light intensity so the image doesn't end up completely white or black.

It will be appreciated that the question during the training of the BFN 60 is whether there is a fracture present for that particular set of raw data and not whether the fracture can be seen with the particular GI parameters that produced the rendered image being used. In other words, in an example where there is a fracture present (as identified by the expert), there may be a particular set of GI parameters where the fracture is visible in the rendered image and a particular set of GI parameters where the fracture is not visible in the rendered image. However, in both these cases (and any other for this set of raw data) the BFN network is trained that there is fracture present.

In practice, there will always be cases where the BFN 60 (e.g. neural network) doesn't "know" what the right answer is (even in cases where a human can see it). In "difficult" cases, the BFN 60 may be likely to choose an inbetween value. Thus, when the classes (values) are 0 and 1, it will choose 0.5. Thus, this may be interpreted as the "certainty" of the BFN 60.

This behavior of the BFN 60 may be affected though. Different results may be obtained depending on which loss function is used. Mean squared error (MSE) is a simple example which is the negative of the expected value of one specific utility function, the quadratic utility function, which may not be the appropriate utility function to use under a given set of circumstances. Due to the square term, the loss does not increase linearly—an error of 1 is more than twice as bad as an error of 0.5. This is often considered a criticism but, in this case, it would be a benefit. It would mean if the BFN 60 is uncertain of the answer it wouldn't just "guess" a 0 or a 1, it will hedge its bets with 0.5 because on average that will give a lower loss score.

When the BFN 60 is unsure of its answer (e.g. because of the particular GI settings), it will predict a 0.5, which can be interpreted as it being "uncertain". This in turn means it is known that the settings need to be altered until it is certain.

In general, the choice of loss term may affect how the BFN 60 responds to uncertainty. Mean squared error (MSE) is an example that may encourage the BFN 60 to remain uncertain, which, for this method, is beneficial.

The above examples generally relate to bone fracture detection and this is a particularly good application for this method. However, it will be appreciated that the method is applicable more generally than just for bone fracture detection and the invention is not limited to detecting bone fractures. That is, it may be used for any way of classifying an image. For example, it may be used to detect other features in a region of interest, such as calcification, anatomical abnormalities, tumours, or soft tissue injuries. Particular features in a region of interest that may be particularly suitable are features that GI is good for visualizing and depend on a lot of parameters of the renderer and also situations where pre-set parameters are not very good. Furthermore, even more generally, the method may be used for detection certainty with respect to the region of interest of medical image data. That is, the method may be used for any classification, not necessarily a pathology or anomaly, e.g. whether a patient is male or female. In other embodiments, the scan data 52 may be data other than medical image data.

Although a global illumination (GI) method has been used to render the medical image data in the examples above, it will be appreciated that in other embodiments, other methods of rendering may be used and the invention is not limited to GI.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image processing apparatus comprising processing circuitry configured to:
   receive medical image data including a region of interest;
   generate first rendering data by rendering the medical image data based on a first rendering condition;
   receive a characteristic value relating to detection certainty with respect to the region of interest by inputting the first rendering data to a machine learning model;
   determine a property of the first rendering condition based on the characteristic value.

2. The apparatus according to claim 1, wherein the processing circuitry is further configured to:
   generate second rendering data by rendering the medical image data based on a second rendering condition which is different from the first rendering condition when the characteristic value is at least one of a), b), c) and d):
   a) lower than a predetermined threshold;
   b) higher than a predetermined threshold;
   c) in a predetermined range;
   d) out of a predetermined range.

3. The apparatus according to claim 2, wherein the processing circuitry is further configured to:
   generate further rendering data by rendering the medical image data based on at least one further rendering condition which is different from the first and second rendering conditions in an iterative optimization process until a stopping criterion is reached.

4. An apparatus according to claim 3, wherein the stopping criterion is at least one of: a determination that a local minimum or maximum of the optimization process has been reached; a predetermined characteristic value or values; a predetermined number of further rendering conditions; and a change in the characteristic value is less than a predetermined percentage over a predetermined number of further rendering conditions.

5. The apparatus according to claim 3, wherein the processing circuitry is further configured to at least one of:
   determine a property of the further rendering condition at which the stopping criterion was reached; and
   display the further rendering data based on the further rendering condition at which the stopping criterion was reached.

6. The apparatus according to claim 1, wherein the processing circuitry is further configured to render the medical image data based on a global illumination method.

7. An apparatus according to claim 6, wherein the property of the rendering conditions is a visualization parameter value or particular configuration of visualization parameter values of the global illumination method.

8. The apparatus according to claim 1, wherein the processing circuitry is further configured to:
   render the medical image data using at least one of: a differentiable renderer and a gradient based method.

9. An apparatus according to claim 1, wherein the characteristic value relates to detection certainty of at least one of: a feature in the region of interest, bone fracture, calcification, anatomical abnormalities, tumours, and soft tissue injuries.

10. The apparatus according to claim 1, wherein the first rendering condition is at least one of a), b) or c):
    a) pre-set;
    b) manually defined;
    c) specifically selected with respect to the region of interest.

11. The apparatus according to claim 1, wherein the processing circuitry is further configured to:
    modify the rendering conditions by limiting to be within a predetermined distance in parameter space from the first rendering condition.

12. The apparatus according to claim 1, wherein the processing circuitry is further configured to:
    determine the characteristic value using at least one of: an ensemble and dropout approach.

13. The apparatus according to claim 3, wherein the iterative optimization process includes a term to discourage rendering conditions that result in an unrealistic image.

14. The apparatus according to claim 13, wherein the term is derived from an adversarially trained classifier that distinguishes between images obtained with given rendering conditions, and images that have been chosen as good images.

15. The apparatus according to claim 1, wherein the processing circuitry is further configured to at least one of:
    select the region of interest of the medical image data and/or of the rendering data automatically or based on input from a user, and
    use a hidden-surface determination algorithm to prevent occlusion of the region of interest.

16. The apparatus according to claim 1, wherein the characteristic value is a single scalar output.

17. A medical image processing method, comprising:
    receiving medical image data including a region of interest;

generating first rendering data by rendering the medical image data based on a first rendering condition;

receiving a characteristic value relating to detection certainty with respect to the region of interest by inputting the first rendering data to a machine learning model;

determining a property of the first rendering condition based on the characteristic value.

18. A medical image processing apparatus comprising processing circuitry configured to:

train a machine learning model to perform a detection task on first rendering data with respect to a region of interest of medical image data, wherein the training is performed on a training set of rendering data that are annotated.

19. A training method comprising:

training a machine learning model to perform a detection task on first rendering data with respect to a region of interest of medical image data, wherein the training is performed on a training set of rendering data that are annotated.

20. The training method of claim 19, wherein the training is performed on the training set of rendering data that are annotated to indicate whether at least one of a) a feature, b) a bone fracture, c) calcification, d) an anatomical abnormality, e) a tumour and f) a soft tissue injury is present in the region of interest.

* * * * *